(12) United States Patent
Huang (10) Patent No.: US 10,584,699 B2
(45) Date of Patent: Mar. 10, 2020

(54) PISTON HEAD RETAINING SYSTEM

(71) Applicant: Federal Signal Corporation, Oak Brook, IL (US)

(72) Inventor: Xiaolun Huang, Naperville, IL (US)

(73) Assignee: Federal Signal Corporation, Oak Brook, IL (US)

( * ) Notice: Subject to any disclaimer, the term of this patent is extended or adjusted under 35 U.S.C. 154(b) by 69 days.

(21) Appl. No.: 15/889,707

(22) Filed: Feb. 6, 2018

(65) Prior Publication Data

US 2019/0242377 A1    Aug. 8, 2019

(51) Int. Cl.
| | |
|---|---|
| *F04B 53/14* | (2006.01) |
| *F16J 7/00* | (2006.01) |
| *F16J 1/12* | (2006.01) |
| *F04B 5/02* | (2006.01) |
| *F04B 9/109* | (2006.01) |
| *F04B 53/16* | (2006.01) |

(52) U.S. Cl.
CPC .............. *F04B 53/147* (2013.01); *F04B 5/02* (2013.01); *F04B 9/109* (2013.01); *F04B 53/144* (2013.01); *F16J 1/12* (2013.01); *F16J 7/00* (2013.01); *F04B 53/162* (2013.01)

(58) Field of Classification Search
CPC .... F16J 1/12; F16J 7/00; F04B 53/147; F04B 53/162
See application file for complete search history.

(56) References Cited

U.S. PATENT DOCUMENTS

| | | | |
|---|---|---|---|
| 1,355,519 A | 10/1920 | Wagner | |
| 1,721,325 A | 7/1929 | Wilson | |
| 3,066,003 A * | 11/1962 | Thassy | F16J 1/12 92/250 |
| 3,397,893 A | 8/1968 | Kampert | |
| 3,700,360 A | 10/1972 | Shaddock | |
| 3,867,871 A * | 2/1975 | Shore | F16B 3/00 92/258 |
| 3,994,604 A * | 11/1976 | Visser | F15B 15/1447 403/15 |
| 4,004,499 A * | 1/1977 | Beck | F16J 1/12 92/257 |
| 4,089,253 A * | 5/1978 | Visser | F16J 1/12 403/343 |
| 4,750,409 A | 6/1988 | Hendry | |
| 5,161,829 A | 11/1992 | Detrick et al. | |
| 5,941,162 A * | 8/1999 | Kiesel | F15B 15/1447 92/245 |
| 6,892,625 B2 | 5/2005 | Blackman et al. | |
| 8,122,812 B2 * | 2/2012 | Herwig | F15B 15/1447 403/299 |
| 8,191,461 B2 * | 6/2012 | Lavergne | F16J 1/12 92/255 |
| 9,611,935 B2 | 4/2017 | Kabir et al. | |
| 2018/0363685 A1 * | 12/2018 | Mainville | F15B 15/1457 |

* cited by examiner

*Primary Examiner* — Thomas E Lazo
(74) *Attorney, Agent, or Firm* — Merchant & Gould P.C.

(57) ABSTRACT

A piston assembly is provided with a piston head retaining structure. The piston assembly includes a piston shaft and a piston head disposed around the piston shaft and providing a piston head face that faces a cylinder wall. The piston assembly further includes a piston head mount element arranged adjacent to the piston head and mounted around the piston shaft and a tensioning device that generates an axial tension between the piston shaft and the piston head.

34 Claims, 8 Drawing Sheets

PISTON HEAD RETAINING SYSTEM

BACKGROUND

Piston assemblies typically include a piston shaft and a piston head. The piston head is connected to the piston head and axially reciprocates together with the piston head. Such piston assemblies are used in various applications, such as reciprocating pumps. For example, reciprocating pumps typically include at least one piston head and a piston shaft that connects the piston head.

The piston head and the piston shaft may be under dynamic and/or cyclically reversing loading conditions and may cause malfunctions when the piston head are not reliably retained with the piston shaft. Therefore, it is desired to provide improved structures for retaining a piston head with a piston shaft.

SUMMARY

In general terms, the present disclosure is directed to systems and methods for retaining a piston head with a piston shaft. In one possible configuration and by non-limiting example, the systems and methods provide a piston head retaining structure that allows ease of installation and service, ease of creating high pretension and mechanical lock to prevent an axial and/or rotational movement of the piston head relative to the piston shaft.

One aspect is a piston assembly including a piston shaft, a piston head, a piston head mount element, and a tensioning device. The piston shaft extends along a piston axis and has a piston head mount portion and a main shaft portion. The piston head is disposed around the piston shaft and provides a piston head face that faces a cylinder wall. The piston head has a first shaft mount bore that receives the piston shaft and includes a mount element recess. The piston head mount element is mounted around the piston head mount portion. The piston head mount element has a second shaft insertion bore that receives the piston head mount portion. The piston head mount element is at least partially received in the mount element recess of the piston head. The tensioning device is configured to generate an axial tension between the piston shaft and the piston head.

In certain examples, the tensioning device includes a plurality of threaded fasteners.

In certain examples, the piston head mount element includes a plurality of threaded bores extending axially and disposed around the second shaft mount bore. The plurality of threaded bores threadedly engages the plurality of threaded fasteners. The plurality of threaded fasteners extends over the plurality of threaded bore and presses against the piston head to generate the axial tension between the piston shaft and the piston head.

In certain examples, the piston head mount element is threadedly engaged with the piston shaft at the piston head mount portion, and the piston head is arranged between the main shaft portion of the piston shaft and the piston head mount element.

In certain examples, the piston head includes a seal groove formed around an inner surface of the first shaft mount bore. The piston assembly may further include a seal disposed in the seal groove and arranged between the piston shaft and the piston head.

In certain examples, the piston head includes a plurality of threaded bores extending axially and disposed around the first shaft mount bore. The plurality of threaded bores threadedly engages the plurality of threaded fasteners and extends over the plurality of threaded bores and presses against the piston head mount element to generate the axial tension between the piston shaft and the piston head.

In certain examples, the piston head is threadedly engaged with the piston shaft at the piston head mount portion, and the piston head mount element is arranged between the main shaft portion of the piston shaft and the piston head.

In certain examples, the piston assembly further include a first seal disposed between the piston shaft and the piston head, and a second seal disposed between the piston head and the piston head mount element.

In certain examples, the piston head mount portion and the main shaft portion of the piston shaft have different diameters. The piston head mount portion may have a first diameter and the main shaft portion has a second diameter greater than the first diameter.

In certain examples, the piston shaft includes a transition portion between the main shaft portion and the piston head mount portion. The transition portion engages with the first shaft mount bore of the piston head and prevents an axial movement of the piston head toward the main shaft portion. In certain examples, the first shaft mount bore may have a shoulder portion complementary to the transition portion of the piston shaft and abut against the transition portion of the piston shaft when the piston head is mounted to the piston shaft. In certain examples, the transition portion of the piston shaft may be tapered such that an axial cross section of the transition portion gradually changes between the main shaft portion and the piston head mount portion.

In certain examples, the piston assembly may further include a lock screw axially inserted at an interface between the piston shaft and the piston head.

In certain examples, the piston shaft includes a first axial notch extending from an end of the piston head mount portion and at an outer diameter. The piston head includes a second axial notch at an inner diameter of the first shaft bore and corresponding to the first axial notch. The piston assembly may further include a lock screw inserted into the first axial notch and the second axial notch when the first axial notch and the second axial notch are aligned.

In certain examples, the piston assembly may further include a lock screw axially inserted at an interface between the piston shaft and the piston head mount element.

In certain examples, the piston shaft includes a first axial notch extending from an end of the piston head mount portion, and the piston head mount element includes a second axial notch corresponding to the first axial notch. The piston assembly may further include a lock screw inserted into the first axial notch and the second axial notch when the first axial notch and the second axial notch are aligned.

In certain examples, the piston assembly may further include a piston ring disposed around the piston head.

In certain examples, the piston head mount element is free of the piston head face.

Another aspect is a displacement pump including a body defining a cylinder, and a piston assembly reciprocating within the cylinder along a longitudinal axis of the cylinder. The piston assembly may include a piston shaft, a piston head, a piston head mount element, and a tensioning device. The piston shaft extends along a piston axis and has a piston head mount portion and a main shaft portion. The piston head is disposed around the piston shaft and provides a piston head face that faces a cylinder wall. The piston head has a first shaft mount bore that receives the piston shaft and including a mount element recess. The piston head mount element is mounted around the piston head mount portion. The piston head mount element has a second shaft insertion bore that receives the piston head mount portion. The piston head mount element is at least partially received in the mount element recess of the piston head. The tensioning device is configured to generate an axial tension between the piston shaft and the piston head.

DETAILED DESCRIPTION

Various embodiments will be described in detail with reference to the drawings, wherein like reference numerals represent like parts and assemblies throughout the several views.

Figure 1:
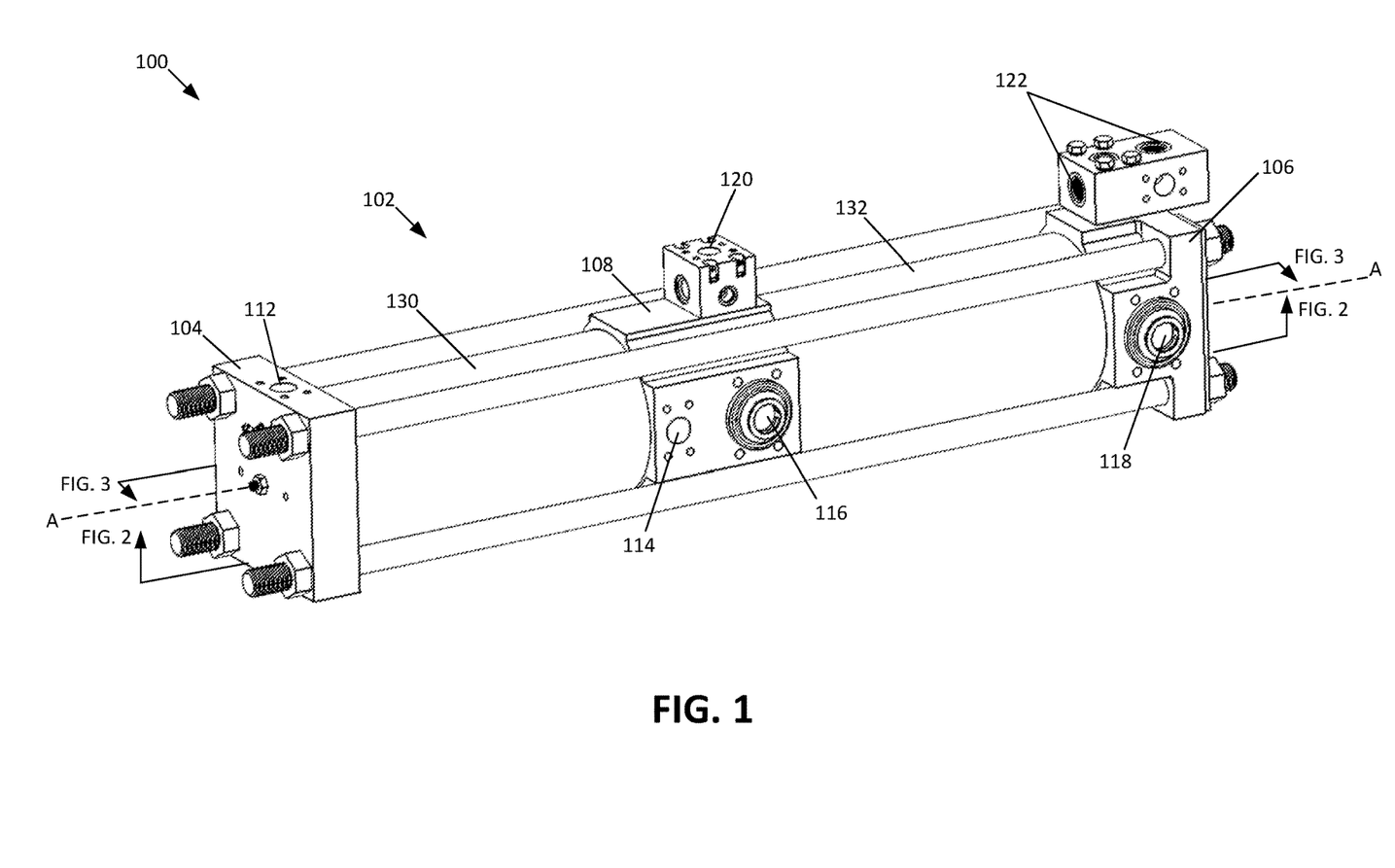
FIG. 1 is a perspective view of an example displacement pump.
Figure 2:
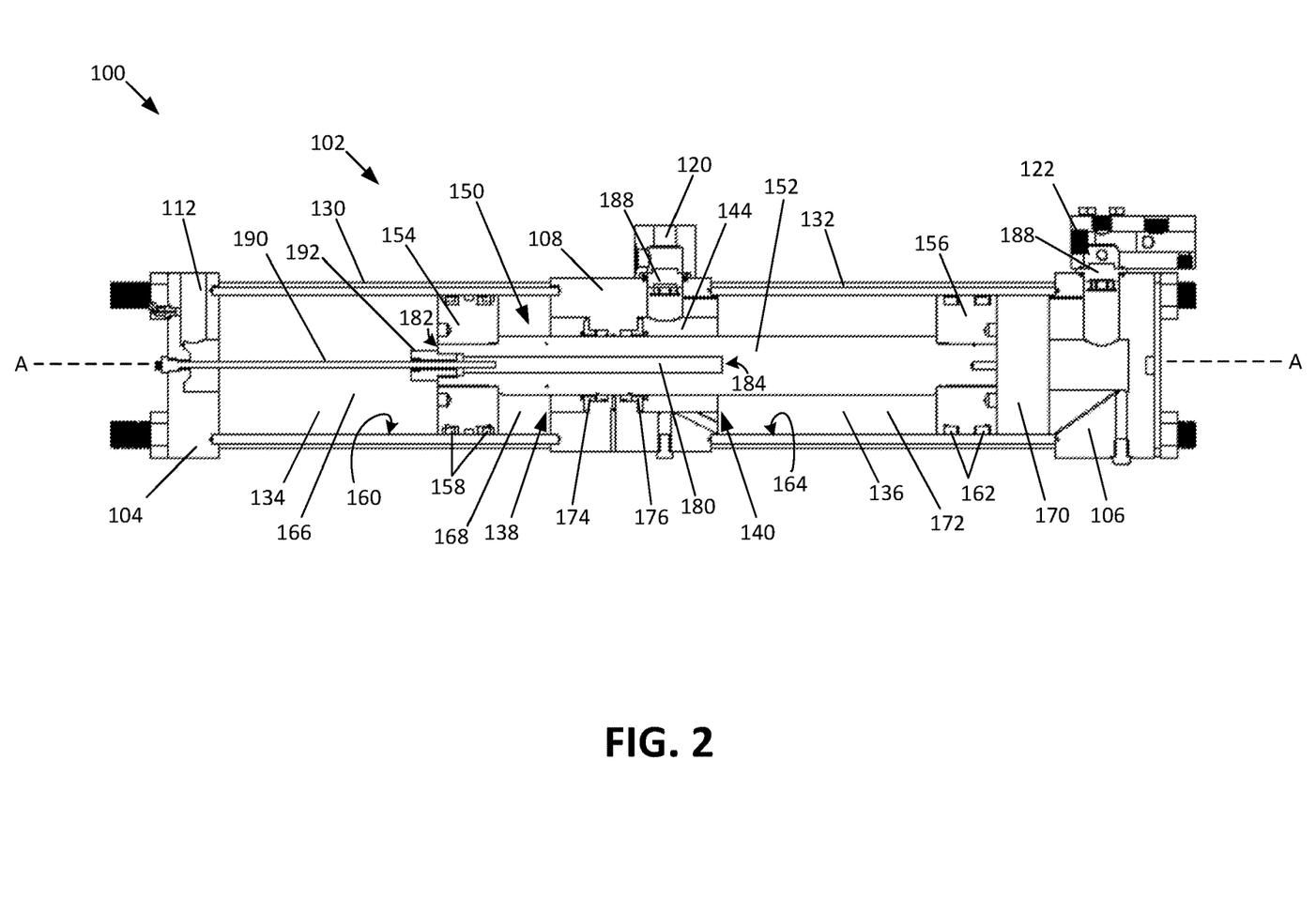
FIG. 2 is a cross-sectional view of the displacement pump of FIG. 1.
Figure 3:
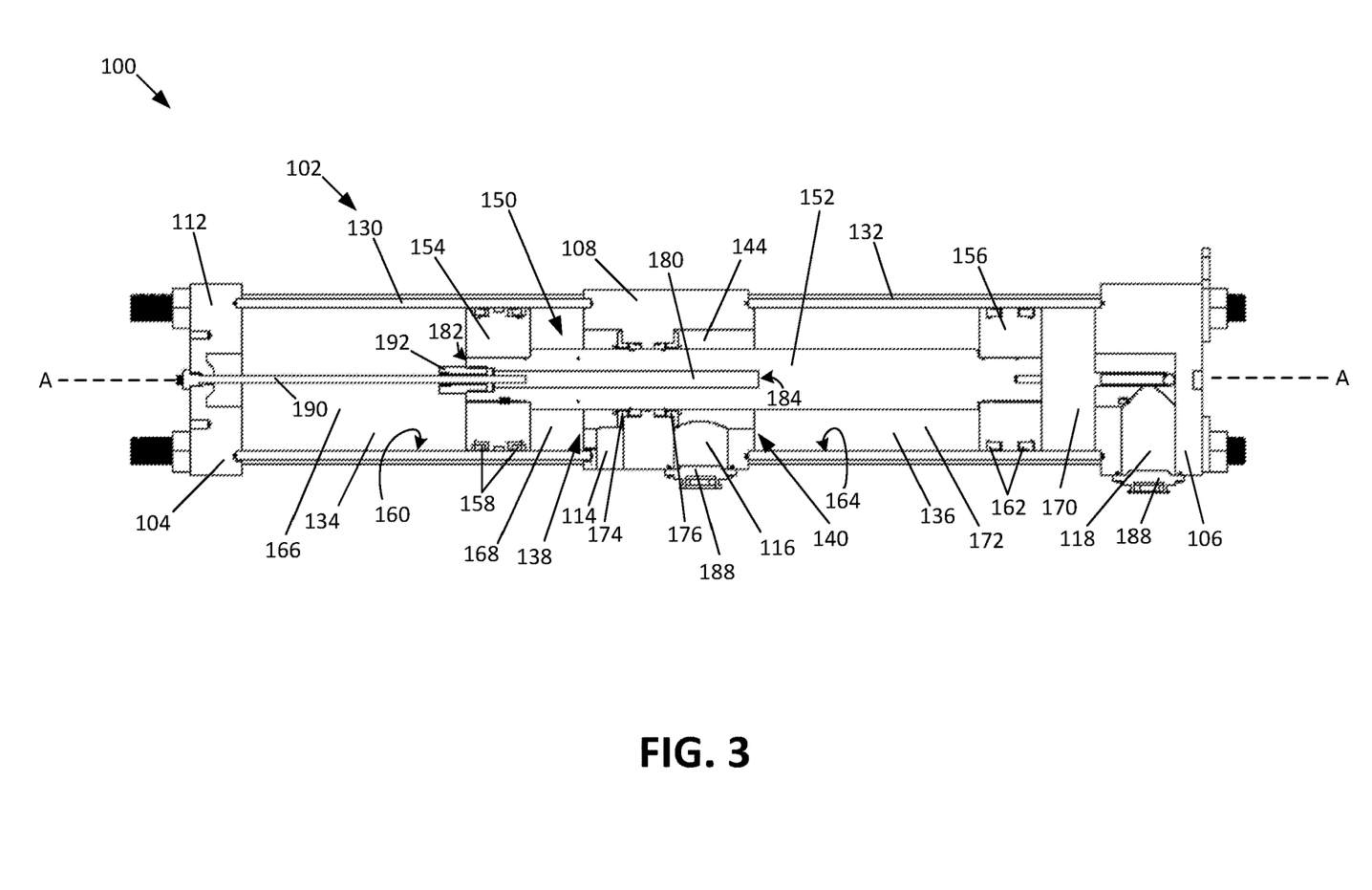
FIG. 3 is another cross-sectional view of the displacement pump of FIG. 1.

Referring to FIGS. 1-3, an example displacement pump 100 is illustrated and described, which can employ the principles of the present disclosure. In particular, FIG. 1 is a perspective view of an example displacement pump 100, FIG. 2 is a cross-sectional view of the displacement pump 100 of FIG. 1, and FIG. 3 is another cross-sectional view of the displacement pump 100 of FIG. 1.

In the illustrated example, the displacement pump 100 is a double-acting tandem piston pump. In this document, the displacement pump 100 is illustrated and described primarily as the tandem piston pump. In other examples, however, the displacement pump 100 can be of different types and/or arrangements suitable for implementing the principles of the present disclosure.

The displacement pump 100 can include a cylinder body assembly 102, a first cylinder end head 104, a second cylinder end head 106, and an intermediate cylinder head 108.

The cylinder body assembly 102 defines one or more cylinders. In this example, the cylinder body assembly 102 includes two cylinders, such as a first cylinder body 130 and a second cylinder body 132. The first cylinder body 130 defines a first cylinder 134 therein, and the second cylinder body 132 defines a second cylinder 136. The first and second cylinder body 130 and 132 are coaxially arranged back-to-back along a longitudinal axis A with the intermediate cylinder head 108 interposed therebetween. The first and second cylinders 134 and 136 can be of the same or different sizes (e.g., diameters).

The first cylinder end head 104 is attached to the first cylinder body 130 on an opposite side to the intermediate cylinder head 108 (e.g., a first base portion 138 (FIG. 2)). The second cylinder end head 106 is attached to the second cylinder body 132 on an opposite side to the intermediate cylinder head 108 (e.g., a second base portion 140 (FIG. 2)). The first and second cylinder end heads 104 and 106 form the opposite ends of the displacement pump 100 along the longitudinal axis A. The first cylinder end head 104 and the intermediate cylinder head 108 secured in opposite axial ends of the first cylinder body 130 define the first cylinder 134. Similarly, the second cylinder end head 106 and the intermediate cylinder head 108 secured in opposite axial ends of the second cylinder body 132 define the second cylinder 136.

The intermediate cylinder head 108 provides a first base portion 138 of the first cylinder 134 on one side thereof, and a second base portion 140 of the second cylinder 136 on the other side thereof. The intermediate cylinder head 108 defines a piston through-hole 144 extending therethrough along the longitudinal axis A. The piston through-hole 144 is configured to movably receive a piston rod 152 that extends therethrough into both of the first and second cylinders 134 and 136. The piston rod 152 is also referred to herein as a piston shaft 152.

With continued reference to FIGS. 1-3, the displacement pump 100 includes a piston assembly 150 that can reciprocate in the first and second cylinders 134 and 136. The piston assembly 150 can include a piston rod 152 extending through the piston through-hole 144 of the intermediate cylinder head 108 into the first and second cylinders 134 and 136. Sealing elements 174 and 176 are provided at an inner surface of the intermediate cylinder head 108 to sealingly engage the piston rod 152 to prevent leakage between the first cylinder 134 (e.g., hydraulic fluid side) and the second cylinder 136 (e.g., water side).

The piston assembly 150 further includes a first piston head 154 and a second piston head 156. The first piston head 154 is secured to an end of the piston rod 152 in the first cylinder 134, and the second piston head 156 is secured to the opposite end of the piston rod 152 in the second cylinder 136. The first piston head 154 defines a first chamber 166 on one face thereof and a second chamber 168 on the opposite face thereof within the first cylinder 134. Similarly, the second piston head 156 defines a first chamber 170 on one face thereof and a second chamber 172 on the opposite face thereof within the second cylinder 136. One or more piston rings 158 are carried in grooves defined in the first piston head 154 and sealingly engage a cylinder wall 160 of the first cylinder 134. Similarly, one or more piston rings 162 are carried in grooves defined in the second piston head 156 and sealingly engage a cylinder wall 164 of the second cylinder 136. Example structures and methods for securing the piston heads to the piston rod are described and illustrated with reference to FIGS. 6-8.

The piston assembly 150 has an elongated rod hole 180 (also referred to herein as an axial recess) in the piston rod 152. In some embodiments, the rod hole 180 is defined coaxially with the piston rod 152 and extends along the longitudinal axis A. The rod hole 180 has an open end 182 and a closed end 184 along the longitudinal axis A within the piston rod 152. In the illustrated example, the open end 182 of the rod hole 180 is arranged toward the first cylinder end head 104 to be open to the first chamber 166 of the first cylinder 134. As described below, the rod hole 180 receives a control rod 190 as the piston assembly 150 reciprocates within the first and second cylinders 134 and 136. The rod hole 180 has a longitudinal length suitable for at least partially receiving the control rod 190 as the piston assembly 150 moves along the longitudinal axis A. The control rod 190 slides through a cap 192 which is mounted (e.g., fastened or threaded) in the end of the piston rod 152.

With continued reference to FIGS. 1-3, the displacement pump 100 further includes a first hydraulic port 112, a second hydraulic port 114, a first water inlet port 116, a second water inlet port 118, a first water outlet port 120, and a second water outlet port 122.

In the illustrated example, the first hydraulic port 112 is defined in the first cylinder end head 104 and in fluid communication with the first chamber 166 of the first cylinder 134. The second hydraulic port 114 is defined in the intermediate cylinder head 108 and in fluid communication with the second chamber 168 of the first cylinder 134. The first water inlet port 116 is defined in the intermediate cylinder head 108 and in fluid communication with the second chamber 172 of the second cylinder 136. The second water inlet port 118 is defined in the second cylinder end head 106 and in fluid communication with the first chamber 170 of the second cylinder 136. The first water outlet port 120 is defined in the intermediate cylinder head 108 and in fluid communication with the second chamber 172 of the second cylinder 136. The second water outlet port 122 is defined in the second cylinder end head 106 and in fluid communication with the first chamber 170 of the second cylinder 136.

Figure 5:
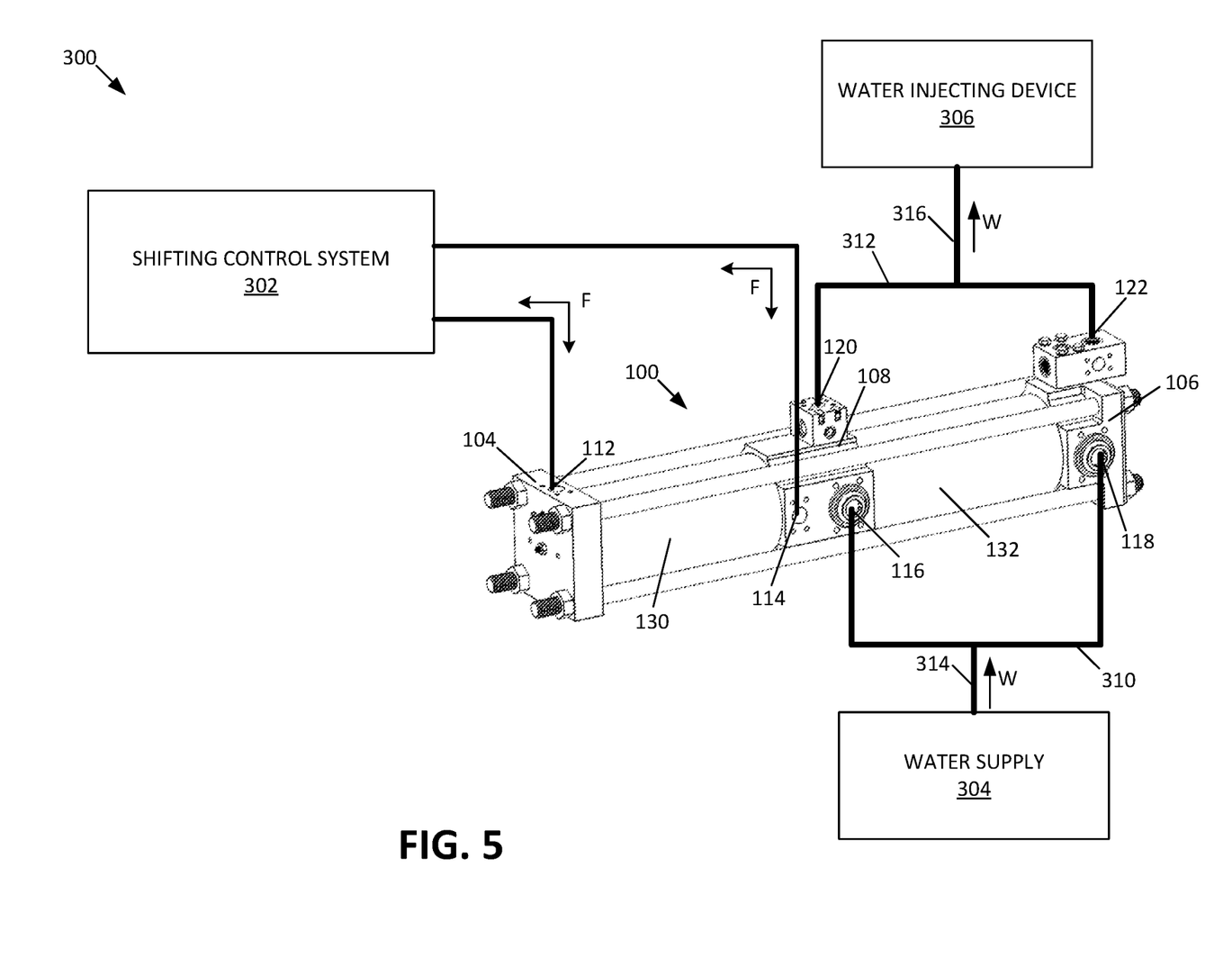
FIG. 5 illustrates an example water pump system using the displacement pump in accordance with the present disclosure.

In the illustrated example, the first piston head 154 moving within the first cylinder 134 is a driving piston actuated by hydraulic fluid (F) under pressure circulated by a shifting control system 302 (FIG. 5). Hydraulic fluid (F) is selectively circulated either from the first chamber 166 to the second chamber 168, or from the second chamber 168 to the first chamber 166, through the first hydraulic port 112, the shifting control system 302 (FIG. 5), and the second hydraulic port 114. For example, when hydraulic fluid (F) is drawn into the first chamber 166 through the first hydraulic port 112, the piston assembly 150 moves toward the second cylinder end head 106 (i.e., in the right direction) and hydraulic fluid (F) is discharged from the second chamber 168 through the second hydraulic port 114. Similarly, when hydraulic fluid (F) is drawn into the second chamber 168 through the second hydraulic port 114, the piston assembly 150 moves toward the first cylinder end head 104 (i.e., in the left direction) and hydraulic fluid (F) is discharged from the first chamber 166 through the first hydraulic port 112.

While the first piston head 154 operates as a driving piston, the second piston head 156 can be a water pumping piston. The second cylinder 136 receives water into the first and second chambers 170 and 172 through the first and second water inlet ports 116 and 118 (e.g., a water inlet manifold 310 (FIG. 5)). Water pumped by the second piston head 156 is discharged from the first and second chambers 170 and 172 of the second cylinder 136 through the first and second water outlet ports 120 and 122 (e.g., a water outlet manifold 312 (FIG. 5)). As further described in FIG. 5, the water inlet manifold 310 is in fluid communication with the first and second water inlet ports 116 and 118 and receives water from a water supply 304 through a conduit 314. The water outlet manifold 312 is in fluid communication with the first and second water outlet ports 120 and 122, and the water is discharged to a water injection device 306 (e.g., a nozzle) through the water outlet manifold 312 and a hose 316.

In some embodiments, check valves 188 are provided in the first water inlet port 116, the second water inlet port 118, the first water outlet port 120, and the second water outlet port 122. The check valves 188 can be spring-loaded to closed positions, and are arranged in the ports so that the valve 188 in the first water inlet port 116 will be closed as the piston assembly 150 is moved to the left-hand end of its stroke, while the valve 188 in the first water outlet port 120 will be open to discharge the water being pumped into the second chamber 172. At the same time the valve 188 in the second water inlet port 118 will be opened to admit water to the first chamber 170 (i.e., the right-hand side of the piston head 156), while the valve 177 in the second water outlet port 122 will be closed. The valves 188 are operated by pressure differentials, with the valves 188 in the first and second water inlet ports 116 and 118 opening on the suction stroke, closing on the pressure stroke, and with the valves 188 in the first and second water outlet ports 120 and 122 closing on the suction stroke and opening on the pressure stroke. These valves 188, therefore, alternately admit water from the water supply 304 to opposite sides of the second piston head 156 and alternately discharge the water on the pressure stroke of the second piston head 156, with one of the valves 188 in the water inlet ports 116 and 118 being opened on one side of the second piston head 156 (i.e., one of the first and second chambers 170 and 172) and one of the valves 188 in the water outlet ports 120 and 122 being opened on the opposite side of the second piston head 156 (i.e., the other of the first and second chamber 170 and 172) at the same time, while the other two valves 188 are closed.

Another example of the displacement pump 100 can also be described in U.S. Pat. No. 3,700,360, titled Double-Acting Tandem Piston Pump, issued Oct. 24, 1972, the disclosure of which is incorporated herein by reference in its entirety.

Figure 4:
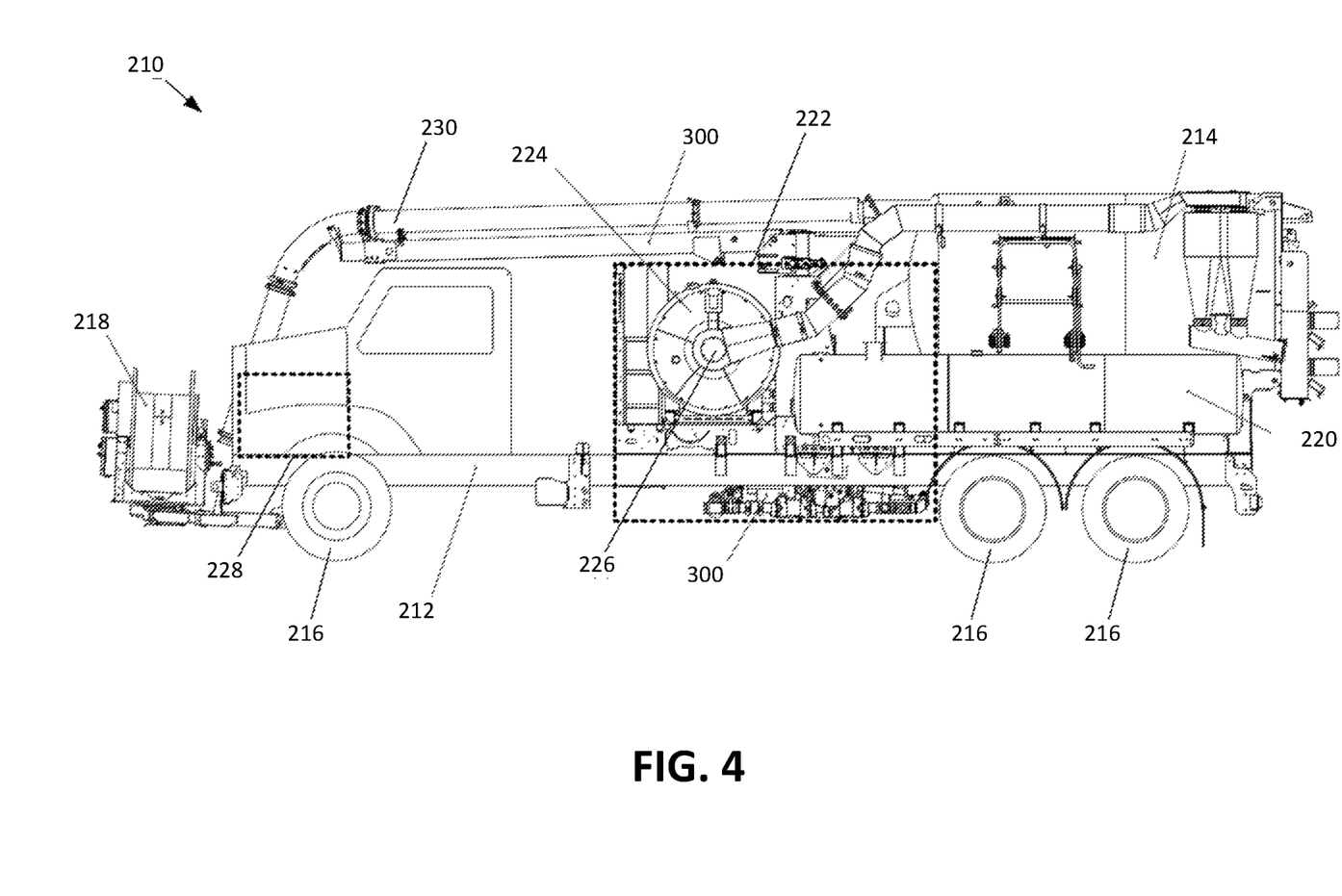
FIG. 4 is a side view of an example debris collection vehicle that may employ the displacement pump of FIG. 1.

FIG. 4 is a side view of an example debris collection vehicle 210 that may employ the displacement pump 100 in accordance with an example embodiment of the present disclosure. In this example, the debris collection vehicle 210 is a sewer cleaning vehicle. In some embodiments, the vehicle 210 includes a chassis 212, a debris collection tank 214, wheels 216, a hose reel 218, water tanks 220, and a fan drive system 222 including a fan assembly 224 and an air inlet 226. The vehicle 210 can also include a power delivery system having a chassis or primary power system 228, which may be an internal combustion engine. The vehicle 210 may also be provided with an optional auxiliary power system. The primary power system 228 provides power for both the driving and non-driving functions of the vehicle 210. Examples of driving functions that require power are the vehicle drive train, the steering system, and the braking system. Examples of non-driving functions associated with the vehicle 210 are pumps and motors relating to the debris collection process. The vehicle 210 is also shown as including a water pump system 300 that can be powered by the primary power system 228, or optionally, an auxiliary power system. The fan drive system 222 is connected to the debris collection tank 214 such that debris can be collected by a suction hose 230 that is also connected to the debris collection tank 214. In other examples, the displacement pump 100 as illustrated in FIGS. 1-3 can be employed in other applications, such as other types of vehicles, machines, and equipment.

FIG. 5 illustrates an example water pump system 300 using the displacement pump 100 in accordance with the present disclosure. In addition to the displacement pump 100, the water pump system 300 can include a shifting control system 302, a water supply 304, and a water injecting device 306. Also shown are a piston position signal 308, a water inlet manifold 310, and a water outlet manifold 312.

The shifting control system 302 operates the piston assembly 150 by selectively providing pressurized hydraulic fluid (F) through either the first hydraulic port 112 or the second hydraulic port 114.

The water supply 304 operates to supply water (W) into the second cylinder 136 through the first and second water inlet ports 116 and 118. The water supply 304 can include the water tanks 220. The water inlet manifold 310 is in fluid communication with the first and second water inlet ports 116 and 118 and receives water from the water supply 304 through a conduit 314.

The water injecting device 306 operates to receive water (W) pumped by the displacement pump 100 and inject the water to a desired place. In some embodiments, the water injecting device 306 includes a nozzle assembly. The water outlet manifold 312 is in fluid communication with the first and second water outlet ports 120 and 122 of the displacement pump 100, and the water is discharged to the water injecting device 306 through the water outlet manifold 312 and a hose 316.

Figure 6:
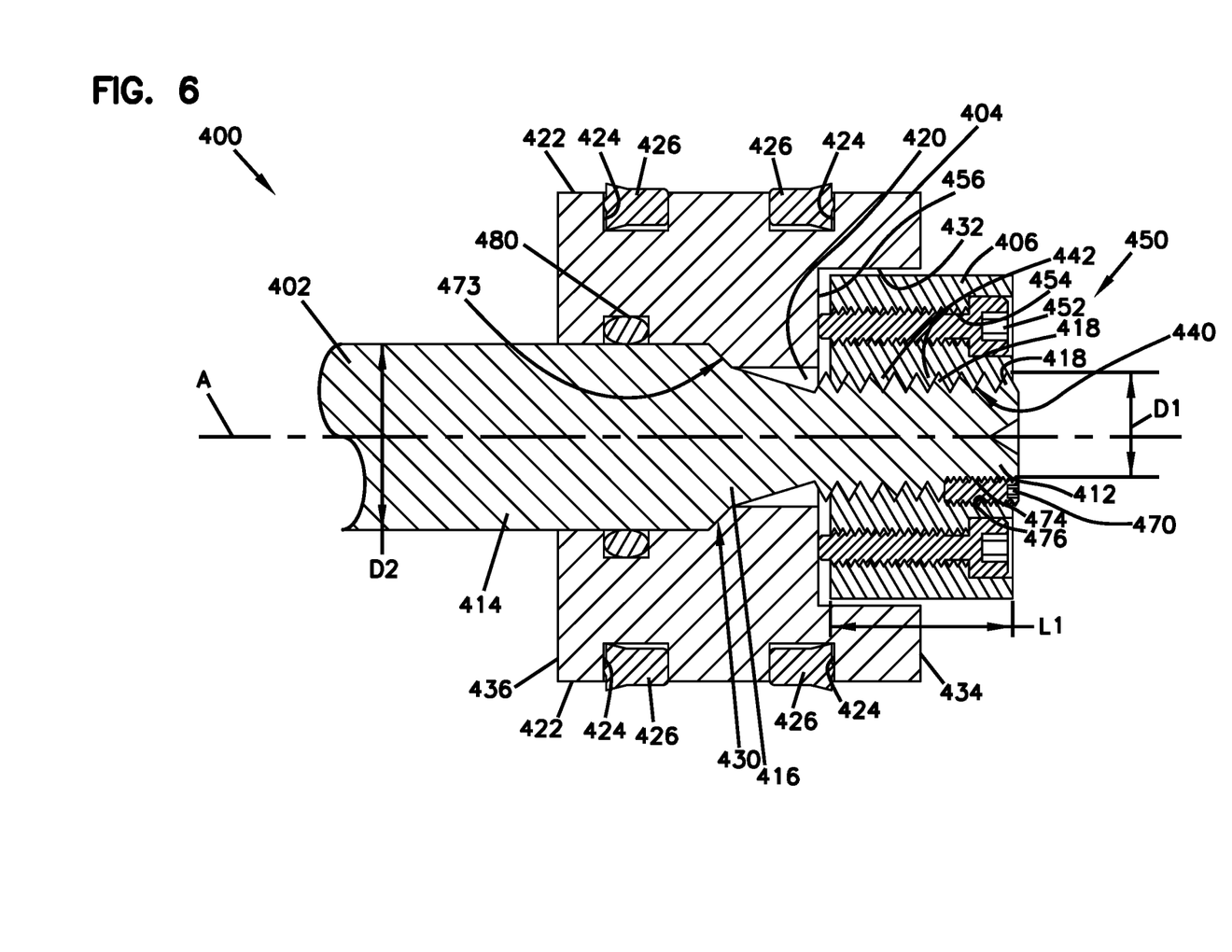
FIG. 6 is a side cross sectional view of a piston head retaining structure in accordance with an example embodiment of the present disclosure.
Figure 7:
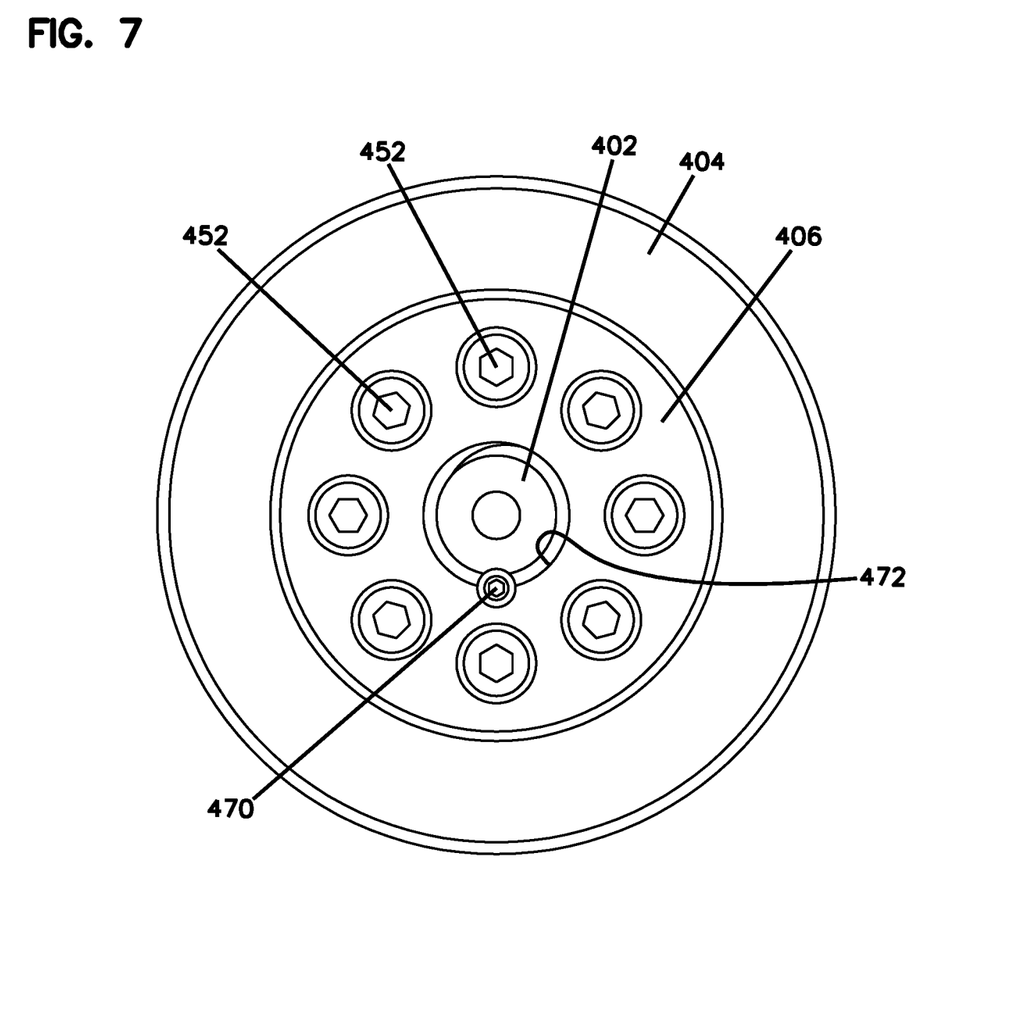
FIG. 7 is a front view of the piston head retaining structure of FIG. 6.
Figure 8:
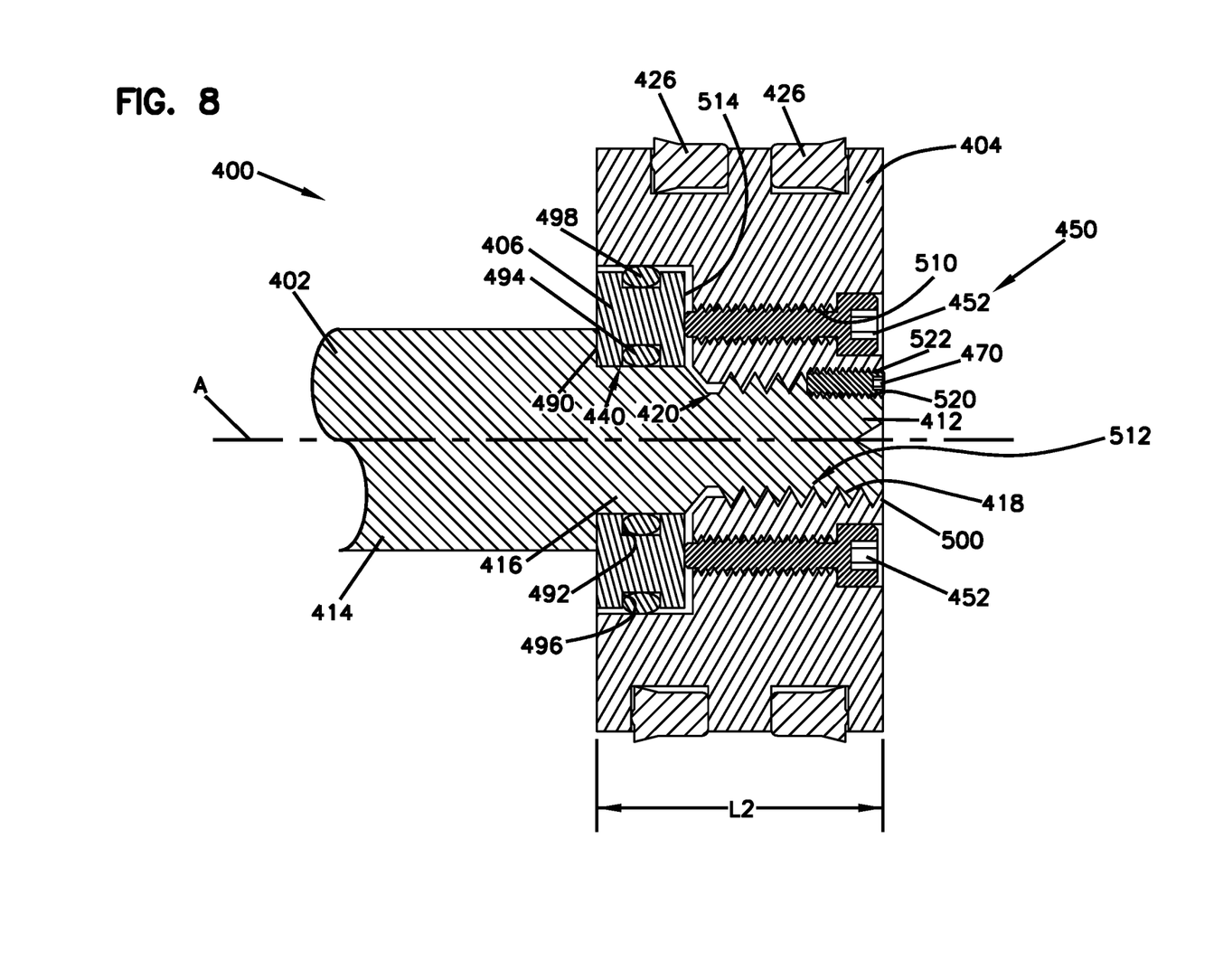
FIG. 8 is a side cross sectional view of the piston head retaining structure in accordance with another example embodiment of the present disclosure.

Referring to FIGS. 6-8, a piston head retaining structure 400 is described in accordance with example embodiments of the present disclosure. FIG. 6 is a side cross sectional view of the piston head retaining structure 400 in accordance with an example embodiment of the present disclosure, and FIG. 7 is a front view of the piston head retaining structure 400 of FIG. 6. FIG. 8 is a side cross sectional view of the piston head retaining structure 400 in accordance with another example embodiment of the present disclosure.

In some examples, the piston head retaining structure 400 can be used to provide the piston assembly 150 as described herein. In other examples, the piston head retaining structure 400 can be used for other types of piston assemblies in various applications.

In general, the piston head retaining structure 400 provides a structure for retaining a piston head to a piston shaft in a reciprocating pump subject to harsh dynamic and cyclically reversing loads. The piston head retaining structure 400 improves the component fatigue life and make installation/reinstallation easier during product life. The piston head retaining structure 400 includes a first member with thread engagement to the piston shaft, and a second member with a shoulder engaged with a stop on the piston shaft. The piston head retaining structure 400 may further include a plurality of threaded fasteners (e.g., jack bolts) threaded on the first member to push the second member against the shaft shoulder stop. Moreover, the piston head retaining structure 400 may include at least one lock screw axially placed at the thread interface between the first member and the piston shaft to mechanically prevent any rotational movement. The piston head retaining structure 400 allows using little effort to generate high pretention to the piston-to-shaft thread section which is critical to the fatigue life at high cyclic loading while ease of assembly using common tools. The piston head retaining structure 400 may be suitably used for various pump applications where high cyclic loading and fast shifting are involved and a secure piston-to-shaft joint, a high fatigue life, and ease of service are demanded.

With reference to FIGS. 6 and 7, the piston head retaining structure 400 includes a piston shaft 402, a piston head 404, and a piston head mount element 406. In examples where the piston head retaining structure 400 is employed in the piston assembly 150, the piston shaft 402 includes the piston rod 152, and the piston head 404 includes the piston head 154, 156, as illustrated in FIGS. 1-3.

As discussed herein, the piston shaft 402 extends along a piston axis A (e.g., the longitudinal axis A) and has a piston head mount portion 412 and a main shaft portion 414. In this example, the piston shaft 402 is configured to be cylindrical, having a circular cross sectional shape. In other examples, the piston shaft 402 can be shaped to have a non-circular cross-section.

The piston head mount portion 412 is configured to at least partially mount the piston head 404 thereon. In addition, the piston head mount portion 412 can at least partially mount the piston head mount element 406 thereon. Where the piston head retaining structure 400 is used in a double-acting tandem piston pump as illustrated in FIGS. 1-5, the main shaft portion 414 can be a portion of the piston shaft 402 that extends between the opposite piston heads (e.g., the first and second piston heads 154, 156).

In some examples, the piston head mount portion 412 and the main shaft portion 414 of the piston shaft 402 are configured to have different cross sectional configurations (e.g., shapes and areas) along the piston axis A. For example, the piston head mount portion 412 has a first diameter D1, and the main shaft portion has a second diameter D2 different from the first diameter D1. In some examples, the first diameter D1 of the piston head mount portion 412 is smaller than the second diameter D2 of the main shaft portion 414. Other configurations of the piston head mount portion 412 and the main shaft portion 414 are also possible in other examples.

The piston head mount portion 412 can include a threaded portion 418 having a thread formed at least partially on an outer diameter of the piston head mount portion 412. As illustrated in FIG. 6, the threaded portion 418 is configured to threadedly engage with the piston head mount element 406.

The piston shaft 402 further includes a transition portion 416 between the piston head mount portion 412 and the main shaft portion 414. As described herein, the transition portion 416 is configured to engage with the piston head 404 and prevents an axial movement of the piston head 404 toward the main shaft portion 414 of the piston shaft 402.

As illustrated, in some examples, the transition portion 416 of the piston shaft 402 is tapered along the piston axis A. For example, the transition portion 416 has an axial cross section that gradually changes between the main shaft portion 414 and the piston head mount portion 412. In the illustrated example, the transition portion 416 is tapered to have a diameter that becomes gradually smaller from the main shaft portion 414 to the piston head mount portion 412.

As illustrated in FIG. 6, the piston head 404 is disposed around the piston shaft 402. The piston head 404 provides a piston head face 422 that faces an inner surface (e.g., the cylinder wall 160, 164) of a cylinder (e.g., the cylinder 134, 136) as the piston head 404 reciprocates within the cylinder. The piston head 404 includes one or more grooves 424, each configured to receive a piston ring 426 (e.g., the piston ring 158, 162) that sealingly engages the inner surface (e.g., the cylinder walls 160, 164) of the cylinder.

In some examples, the piston head 404 includes a first shaft insertion bore 420 configured to receive the piston shaft 402. In some examples, the piston head 404 has a shoulder portion 430 at the first shaft insertion bore 420. The shoulder portion 430 can be configured to be complementary to the transition portion 416 of the piston shaft 402 and abut with the transition portion 416 of the piston shaft 402 when the piston head 404 is mounted to the piston shaft 402. For example, when the piston shaft 402 is inserted through the first shaft insertion bore 420 of the piston head 404 along the piston axis A, the shoulder portion 430 of the piston head 404 seats against the transition portion 416 of the piston shaft 402 so that the piston head 404 is stopped from axially moving in a direction toward the main shaft portion 414 of the piston shaft 402.

In some examples, the shoulder portion 430 at the first shaft insertion bore 420 of the piston head 404 can also be tapered to correspond to the tapered configuration of the transition portion 416 of the piston shaft 402.

The complementary shapes of the transition portion 416 of the piston shaft 402 and the shoulder portion 430 of the piston head 404 can help guiding and aligning the piston head 404 with respect to the piston shaft 402. For example, the outer diameter of the piston shaft 402 is used to guide and center the piston head 404, and the transition portion 416 of the piston shaft 402 stops the axial movement of the piston head 404 by engaging with the shoulder portion 430 of the piston head 404, thereby increasing axial bearing capability of the piston shaft 402. Further, the transition portion 416 of the piston shaft 402 and the shoulder portion 430 of the piston head 404 are configured to align the centers of the piston head 404 and the piston shaft 402, thereby easing a higher requirement for concentricity of a thread 418 formed on the piston shaft 402. Thus, lower precision methods (e.g., rolling) for forming the thread 418 on the piston shaft 402 (as well as a thread 442 on the piston head mount element 406) can be used in manufacturing to increase a fatigue life of the thread.

In other embodiments, the transition portion 416 of the piston shaft 402 is configured for the piston head mount element 406 to seat thereon.

In some examples, the piston head 404 can include a mount element recess 432 configured to at least partially receive the piston head mount element 406, as described below. In the illustrated example of FIG. 6, the mount element recess 432 is provided around the first shaft insertion bore 420 at a distal end 434 of the piston head 404. In some examples, when the piston head 404 is mounted to the piston shaft 402, the distal end 434 of the piston head 404 is arranged adjacent the piston head mount portion 412 of the piston shaft 402 while a proximate end 436 (opposite to the distal end 434) of the piston head 404 is arranged adjacent the main shaft portion 414 of the piston shaft 402.

Referring still to FIGS. 6 and 7, the piston head mount element 406 is configured to be disposed around the piston shaft 402 and arranged to generate an axial tension between the piston shaft 402 and the piston head 404.

The piston head mount element 406 includes a second shaft insertion bore 440 configured to receive the piston shaft 402. In some examples, the second shaft insertion bore 440 is configured to receive the piston head mount portion 412 of the piston shaft 402. The second shaft insertion bore 440 can include a thread 442 at an inner diameter thereof, so that the piston head mount element 406 is threadedly engaged with the piston shaft 402. For example, the thread 442 of the piston head mount element 406 is engaged with the threaded portion 418 of the piston shaft 402 at the piston head mount portion 412 so that the piston head mount element 406 is threadedly coupled with the piston shaft 402 at the piston head mount portion 412 thereof.

As illustrated in FIG. 6, the piston shaft 402 engages with the piston head 404 and the piston head mount element 406 such that the piston head 404 is arranged generally between the main shaft portion 414 of the piston shaft 402 and the piston head mount element 406. For example, the piston head 404 is first disposed around the piston shaft 402 so that the shoulder portion 430 of the piston head 404 rests against the transition portion 416 of the piston shaft 402. Then, the piston head mount element 406 is inserted from the distal end 434 of the piston head 404 and mounted to the piston shaft 402 at the piston head mount portion 412. As discussed herein, the piston head mount element 406 can be threadedly engaged with the piston head mount portion 412 of the piston shaft 402 using the threaded portion 418 of the piston shaft 402 and the thread 442 of the piston head mount element 406.

In some examples, when engaged with the piston shaft 402, the piston head mount element 406 is at least partially received into the mount element recess 432 of the piston head 404, as illustrated in FIG. 6. The piston head mount element 406 can be arranged like a crown with respect to the piston head 404. The mount element recess 432 can help axially aligning the piston head mount element 406 with the piston head 404.

In some examples, the piston head mount element 406 is received in the piston head 404 and does not provide a surface that is adjacent with, or engages with, the inner surface (e.g., the cylinder wall 160, 164) of the cylinder (e.g., the cylinder 134, 136) as the piston head 404 reciprocates within the cylinder. For example, the piston head mount element 406 does not contribute to the piston head face 422 of the piston head 404, and thus the piston head 404 is solely abut with, or engaged with, the inner surface (e.g., the cylinder wall 160, 164) of the cylinder (e.g., the cylinder 134, 136) at the piston head face 422.

Referring to FIGS. 6 and 7, a tensioning device 450 is provided to generate an axial tension between the piston shaft 402 and the piston head 404. In some examples, the tensioning device 450 is configured to cause expansion between the piston head 404 and the piston head mount element 406 and thus generates an axial tension at a threaded interface 472 between the piston shaft 402 and the piston head mount element 406. The threaded interface 472 can include an interface between the threaded portion 418 of the piston shaft 402 and the thread 442 of the piston head mount element 406. Further, the tensioning device 450 can generate an axial tension at an interface 473 between the piston shaft 402 and the piston head 404. The interface 473 can include an interface between the shoulder portion 430 of the piston head 404 and the transition portion 416 of the piston shaft 402.

In some examples, the tensioning device 450 includes one or more threaded fasteners 452. The threaded fasteners 452 can be of various types, such as bolts, jack bolts, screws, and any other suitable fasteners.

The piston head mount element 406 can include one or more threaded bores 454 disposed around the second shaft insertion bore 440 and axially extending through an axial length L1 of the piston head mount element 406. The threaded bores 454 are configured to threadedly engage the threaded fasteners 452, respectively. The threaded fasteners 452 can be engaged in the threaded bores 454 and extend over the threaded bores 454 to press against the piston head 404. As illustrated in FIG. 6, the tips (distal ends) of the threaded fasteners 452 can abut with a bottom surface 456 of the mount element recess 432 of the piston head 404 to axially press against the piston head 404. The pressing force can generate the axial tension at the threaded interface between the piston shaft 402 and the piston head mount element 406, and/or at the interface between the piston shaft 402 and the piston head 404.

In some examples, the piston head retaining structure 400 includes a lock screw 470 configured to further retain the piston head mount element 406 to the piston shaft 402. As illustrated in FIGS. 6 and 7, the lock screw 470 is axially inserted at the threaded interface 472 between the piston shaft 402 (e.g., the piston head mount portion 412 thereof) and the piston head mount element 406.

For example, the piston shaft 402 includes a first axial notch 474 formed at an exterior portion of the piston head mount portion 412 of the piston shaft 402 and axially extending from the free end of the piston head mount portion 412 of the piston shaft 402. The piston head mount element 406 includes a second axial notch 476 formed at an interior portion of the second shaft insertion bore 440 of the piston head mount element 406 and axially extending from an end of the piston head mount element 406. The second axial notch 476 is configured to correspond to the first axial notch 474 and be aligned with the first axial notch 474 when the piston head mount element 406 is mounted to the piston shaft 402 at the piston head mount portion 412 thereof. The first axial notch 474 and the second axial notch 476 cooperate and form a bore for receiving the lock screw 470. The bore can be threaded in some examples. The lock screw 470 is inserted into the first axial notch 474 and the second axial notch 476 when the first axial notch 474 and the second axial notch 476 are aligned.

Although a single lock screw 470 is illustrated herein, it is understood that a plurality of lock screws 470 and a plurality of corresponding notches 474, 476 can be provided.

Referring still to FIG. 6, the piston head retaining structure 400 includes a seal 480 disposed between the piston shaft 402 and the piston head 404. In some examples, the piston head 404 includes a seal groove 482 formed around the inner diameter of the first shaft insertion bore 420 and configured to receive the seal 480 so that the seal 480 is arranged between the piston shaft 402 and the piston head 404. The formation of the seal groove on the piston head 404 can remove a seal groove on the piston shaft 402, thereby increasing the strength of the piston shaft 402. In some examples, the seal 480 includes an O-ring.

In some examples, the threads of the threaded fasteners 452 are smaller in size and pitch than the thread at the interface between the piston shaft and the piston head mount element. Thus, a higher pure tension against the piston shaft can be achieved with a fraction of the torque that would be required by the threaded engagement between the piston shaft and the piston head mount element. Because the tensioning device 450 provides the axial tension between the piston shaft and the piston head mount element, the piston head mount element do not need to be tightened on the piston shaft by the full torque. Therefore, after removing the tensioning device (e.g., the threaded fasteners), it is easy to loosen the piston head mount element (and then the piston head) from the piston shaft when service is required. When reinstalling, a technician can simply turn in the piston head mount element on the piston shaft until the first and second axial notches line up, and then tighten the tensioning device (e.g., the threaded fasteners) and secure the piston head mount element (and thus the piston head) with the lock screw.

Referring now to FIG. 8, the piston head retaining structure 400 is described and illustrated in accordance with another example embodiment of the present disclosure. As many of the concepts and features are similar to the embodiment shown in FIGS. 6 and 7, the description for the first embodiment is hereby incorporated by reference for the second embodiment. Where like or similar features or elements are shown, the same reference numbers will be used where possible. The following description for the second embodiment will be limited primarily to the differences between the first and second embodiments.

In this embodiment, the piston head mount element 406 is disposed around the piston shaft 402 first and then the piston head 404 is mounted to the piston shaft 402, so that the piston head mount element 406 is arranged generally between the main shaft portion 414 of the piston shaft 402 and the piston head 404. For example, the piston head mount element 406 rests against the transition portion 416 of the piston shaft 402, and then the piston head 404 is inserted from the free end of the piston shaft 402 (e.g., from the side of the piston head mount portion 412 of the piston shaft 402). In some examples, the transition portion 416 of the piston shaft 402 has a stepped shoulder 490 on which the piston head mount element 406 seats.

The piston head mount element 406 has the second shaft insertion bore 440 to receive the piston shaft 402 (e.g., the transition portion 416 thereof). In this embodiment, the second shaft insertion bore 440 need not be threaded.

The piston head mount element 406 can include at least one inner seal groove 492 that is formed an interior surface of the second shaft insertion bore 440 and configured to receive an inner seal 494 so that the inner seal 494 is arranged between the piston head mount element 406 and the piston shaft 402 (e.g., the transition portion 416 thereof). In addition, the piston head mount element 406 includes at least one outer seal groove 496 that is formed an exterior surface of the piston head mount element 406 and configured to receive an outer seal 498 so that the outer seal 498 is arranged between the piston head mount element 406 and the piston head 404.

In some embodiments, the inner seal groove 492 and the outer seal groove 496 are entirely formed in the piston head mount element 406, and the piston shaft 402 and the piston head 404 do not provide corresponding grooves for the seals 494, 498 and thus are free of seal grooves.

The piston head 404 includes the mount element recess 432 configured to receive the piston head mount element 406. In this embodiment, the piston head mount element 406 is formed on the piston head 404 adjacent the transition portion 416 (e.g., the stepped shoulder 490) of the piston shaft 402 so that the piston head mount element 406 is sandwiched between the transition portion 416 (e.g., the stepped shoulder 490) and the piston head 404. In the illustrated example, the piston head mount element 406 is fully received within the mount element recess 432 of the piston head 404. In other examples, the piston head mount element 406 is partially received within the mount element recess 432 of the piston head 404.

In this embodiment, instead of the piston head mount element 406, the piston head 404 is threadedly engaged with the piston shaft 402 at the piston head mount portion 412. The piston head 404 includes a thread 500 provided on an inner surface of the first shaft insertion bore 420. The thread 500 of the piston head 404 is engaged with the threaded portion 418 of the piston shaft 402.

Similar to the embodiment as illustrated in FIGS. 6 and 7, the tensioning device 450 is used to cause expansion between the piston head 404 and the piston head mount element 406. In this embodiment, however, the piston head 404 further includes one or more threaded bores 510 for receiving the threaded fasteners 452. The threaded bores 510 are disposed around the first shaft insertion bore 420 and axially extending through an axial length L2 of the piston head 404. The threaded bores 510 are configured to threadedly engage the threaded fasteners 452, respectively. The threaded fasteners 452 can be engaged in the threaded bores 510 and extend over the threaded bores 510 to press against the piston head mount element 406. As illustrated in FIG. 8, the tips of the threaded fasteners 452 can abut with a surface 514 of the piston head mount element 406 to axially press against the piston head mount element 406. The pressing force can generate the axial tension at the threaded interface 512 between the piston shaft 402 and the piston head 404, and/or at the interface (e.g., the stepped shoulder 490) between the piston shaft 402 and the piston head mount element 406.

In this embodiment, the lock screw 470 is used to further retain the piston head 404 to the piston shaft 402. As illustrated in FIG. 8, the lock screw 470 is axially inserted at the threaded interface 512 between the piston shaft 402 and the piston head 404.

Similar to the embodiment as illustrated in FIGS. 6 and 7, the piston shaft 402 includes a first axial notch 520 formed at an exterior portion of the piston head mount portion 412 of the piston shaft 402 and axially extending from the free end of the piston head mount portion 412 of the piston shaft 402. The piston head 404 includes a second axial notch 522 formed at an interior portion of the first shaft insertion bore 420 of the piston head 404 and axially extending from an end of the piston head 404. The second axial notch 522 is configured to correspond to the first axial notch 520 and be aligned with the first axial notch 520 when the piston head 404 is mounted to the piston shaft 402 at the piston head mount portion 412 thereof. The first axial notch 520 and the second axial notch 522 cooperate and form a bore for receiving the lock screw 470. The bore can be threaded in some examples. The lock screw 470 is inserted into the first axial notch 520 and the second axial notch 522 when the first axial notch 520 and the second axial notch 522 are aligned.

Although a single lock screw 470 is illustrated herein, it is understood that a plurality of lock screws 470 and a plurality of corresponding notches 520, 522 can be provided.

According to the present disclosure, the piston head retaining structure 400 improves the piston-to-shaft fastening with low torque effort. The piston head retaining structure 400 creates high pretension with easy to increase thread fatigue life. Further, the piston head retaining structure 400 significantly reduces the demand on grabbing the piston or shaft during assembly or disassembly, so that simplify the structure and service tooling.

In addition, the piston head retaining structure 400 provides a solution to re-use lock screw location(s) so that in field service is easier. Further, the piston head retaining structure 400 places the seal groove in the piston bore instead on the shaft to maximize shaft strength.

Moreover, the piston head retaining structure 400 utilizes the shaft outer diameter to guide and center the piston, and a tapered shoulder stop to increase the axial bearing capability of the shaft. Thus, it does not demand on concentricity of the thread to the shaft, so that rolling thread or other lower precision thread forming methods to increase the thread fatigue life could be used in manufacturing.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:
1. A piston assembly comprising:
   a piston shaft extending along a piston axis and having a piston head mount portion and a main shaft portion;
   a piston head disposed around the piston shaft and providing a piston head face that faces a cylinder wall, the piston head having a first shaft mount bore that receives the piston shaft and including a mount element recess;
   a piston head mount element mounted around the piston head mount portion, the piston head mount element having a second shaft insertion bore that receives the piston head mount portion, the piston head mount element at least partially received in the mount element recess of the piston head;
   a tensioning device that generates an axial tension between the piston shaft and the piston head; and
   a lock screw axially inserted at an interface between the piston shaft and the piston head.
2. The piston assembly of claim 1, wherein the tensioning device includes a plurality of threaded fasteners.
3. The piston assembly of claim 2, wherein the piston head mount element includes a plurality of threaded bores extending axially and disposed around the second shaft mount bore, the plurality of threaded bores threadedly engaging the plurality of threaded fasteners, the plurality of threaded fasteners extending over the plurality of threaded bore and pressing against the piston head to generate the axial tension between the piston shaft and the piston head.
4. The piston assembly of claim 3, wherein the piston head mount element is threadedly engaged with the piston shaft at the piston head mount portion, and the piston head is arranged between the main shaft portion of the piston shaft and the piston head mount element.
5. The piston assembly of claim 4, wherein the piston head includes a seal groove formed around an inner surface of the first shaft mount bore,
   further comprising a seal disposed in the seal groove and arranged between the piston shaft and the piston head.
6. The piston assembly of claim 2, wherein the piston head includes a plurality of threaded bores extending axially and disposed around the first shaft mount bore, the plurality of threaded bores threadedly engaging the plurality of threaded fasteners and extending over the plurality of threaded bores and pressing against the piston head mount element to generate the axial tension between the piston shaft and the piston head.
7. The piston assembly of claim 6, wherein the piston head is threadedly engaged with the piston shaft at the piston head mount portion, and the piston head mount element is arranged between the main shaft portion of the piston shaft and the piston head.
8. The piston assembly of claim 7, further comprising a first seal disposed between the piston shaft and the piston head, and a second seal disposed between the piston head and the piston head mount element.
9. The piston assembly of claim 1, wherein the piston head mount portion and the main shaft portion of the piston shaft have different diameters.
10. The piston assembly of claim 9, wherein the piston head mount portion has a first diameter and the main shaft portion has a second diameter greater than the first diameter.
11. The piston assembly of claim 1, wherein the piston shaft includes a transition portion between the main shaft portion and the piston head mount portion, the transition portion engaging with the first shaft mount bore of the piston head and preventing an axial movement of the piston head toward the main shaft portion.
12. The piston assembly of claim 11, wherein the first shaft mount bore has a shoulder portion complementary to the transition portion of the piston shaft and abutting against the transition portion of the piston shaft when the piston head is mounted to the piston shaft.

13. The piston assembly of claim 11, wherein the transition portion of the piston shaft is tapered such that an axial cross section of the transition portion gradually changes between the main shaft portion and the piston head mount portion.

14. The piston assembly of claim 1,
wherein the piston shaft includes a first axial notch extending from an end of the piston head mount portion and at an outer diameter;
wherein the piston head includes a second axial notch at an inner diameter of the first shaft bore and corresponding to the first axial notch, and wherein the
lock screw is inserted into the first axial notch and the second axial notch when the first axial notch and the second axial notch are aligned.

15. The piston assembly of claim 1, wherein the lock screw is positioned between the piston shaft and the piston head mount element.

16. The piston assembly of claim 1,
wherein the piston shaft includes a first axial notch extending from an end of the piston head mount portion; and
wherein the piston head mount element includes a second axial notch corresponding to the first axial notch, and wherein the
lock screw is inserted into the first axial notch and the second axial notch when the first axial notch and the second axial notch are aligned.

17. The piston assembly of claim 1, further comprising: a piston ring disposed around the piston head.

18. The piston assembly of claim 1, wherein the piston head mount element is free of the piston head face.

19. A displacement pump comprising:
a body defining a cylinder;
a piston assembly reciprocating within the cylinder along a longitudinal axis of the cylinder, the piston assembly including:
a piston shaft extending along a piston axis and having a piston head mount portion and a main shaft portion;
a piston head disposed around the piston shaft and providing a piston head face that faces a cylinder wall, the piston head having a first shaft mount bore that receives the piston shaft and including a mount element recess;
a piston head mount element mounted around the piston head mount portion, the piston head mount element having a second shaft insertion bore that receives the piston head mount portion, the piston head mount element at least partially received in the mount element recess of the piston head;
a tensioning device that generates an axial tension between the piston shaft and the piston head; and
a lock screw axially inserted at an interface between the piston shaft and the piston head.

20. A piston assembly comprising:
a piston shaft extending along a piston axis and having a piston head mount portion and a main shaft portion;
a piston head disposed around the piston shaft and providing a piston head face that faces a cylinder wall, the piston head having a first shaft mount bore that receives the piston shaft and including a mount element recess;
a piston head mount element mounted around the piston head mount portion, the piston head mount element having a smooth second shaft insertion bore that non-threadably receives the piston head mount portion, the piston head mount element at least partially received in the mount element recess of the piston head; and
a tensioning device that generates an axial tension between the piston shaft and the piston head.

21. The piston assembly of claim 20, wherein the tensioning device includes a plurality of threaded fasteners.

22. The piston assembly of claim 21, wherein the piston head mount element includes a plurality of threaded bores extending axially and disposed around the second shaft mount bore, the plurality of threaded bores threadedly engaging the plurality of threaded fasteners, the plurality of threaded fasteners extending over the plurality of threaded bore and pressing against the piston head to generate the axial tension between the piston shaft and the piston head.

23. The piston assembly of claim 22, wherein the piston head mount element is threadedly engaged with the piston shaft at the piston head mount portion, and the piston head is arranged between the main shaft portion of the piston shaft and the piston head mount element.

24. The piston assembly of claim 23, wherein the piston head includes a seal groove formed around an inner surface of the first shaft mount bore,
further comprising a seal disposed in the seal groove and arranged between the piston shaft and the piston head.

25. The piston assembly of claim 21, wherein the piston head includes a plurality of threaded bores extending axially and disposed around the first shaft mount bore, the plurality of threaded bores threadedly engaging the plurality of threaded fasteners and extending over the plurality of threaded bores and pressing against the piston head mount element to generate the axial tension between the piston shaft and the piston head.

26. The piston assembly of claim 25, wherein the piston head is threadedly engaged with the piston shaft at the piston head mount portion, and the piston head mount element is arranged between the main shaft portion of the piston shaft and the piston head.

27. The piston assembly of claim 26, further comprising a first seal disposed between the piston shaft and the piston head, and a second seal disposed between the piston head and the piston head mount element.

28. The piston assembly of claim 20, wherein the piston head mount portion and the main shaft portion of the piston shaft have different diameters.

29. The piston assembly of claim 28, wherein the piston head mount portion has a first diameter and the main shaft portion has a second diameter greater than the first diameter.

30. The piston assembly of claim 20, wherein the piston shaft includes a transition portion between the main shaft portion and the piston head mount portion, the transition portion engaging with the first shaft mount bore of the piston head and preventing an axial movement of the piston head toward the main shaft portion.

31. The piston assembly of claim 30, wherein the first shaft mount bore has a shoulder portion complementary to the transition portion of the piston shaft and abutting against the transition portion of the piston shaft when the piston head is mounted to the piston shaft.

32. The piston assembly of claim 30, wherein the transition portion of the piston shaft is tapered such that an axial cross section of the transition portion gradually changes between the main shaft portion and the piston head mount portion.

33. The piston assembly of claim 20, further comprising: a piston ring disposed around the piston head.

34. The piston assembly of claim 20, wherein the piston head mount element is free of the piston head face.

\* \* \* \* \*